US009710802B2

(12) United States Patent
Carlson et al.

(10) Patent No.: US 9,710,802 B2
(45) Date of Patent: Jul. 18, 2017

(54) MERCHANT COMPETITION ALERT

(75) Inventors: Mark Carlson, Half Moon Bay, CA (US); Patrick Stan, Pacifica, CA (US); Patrick Faith, Pleasanton, CA (US); Ayman Hammad, Pleasanton, CA (US); Ben Rewis, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 955 days.

(21) Appl. No.: 12/767,363

(22) Filed: Apr. 26, 2010

(65) Prior Publication Data
US 2010/0299208 A1 Nov. 25, 2010

Related U.S. Application Data

(60) Provisional application No. 61/173,371, filed on Apr. 28, 2009.

(51) Int. Cl.
*G06Q 40/00* (2012.01)
*G06Q 20/32* (2012.01)
*G06Q 30/02* (2012.01)

(52) U.S. Cl.
CPC ......... *G06Q 20/3221* (2013.01); *G06Q 20/32* (2013.01); *G06Q 30/0251* (2013.01); *G06Q 30/0267* (2013.01)

(58) Field of Classification Search
CPC ........ G06Q 40/00; G06Q 40/04; G06Q 20/10; G06Q 20/3674
USPC .......................................................... 705/35
See application file for complete search history.

(56) References Cited

U.S. PATENT DOCUMENTS

| | | |
|---|---|---|
| 5,448,471 A | 9/1995 | Deaton et al. |
| 5,483,444 A | 1/1996 | Heintzeman et al. |
| 5,513,250 A | 4/1996 | McAllister |
| 5,530,438 A | 6/1996 | Bickham et al. |
| 5,592,560 A | 1/1997 | Deaton et al. |
| 5,604,921 A | 2/1997 | Alanara |
| 5,615,110 A | 3/1997 | Wong |
| 5,642,485 A | 6/1997 | Deaton et al. |
| 5,708,422 A | 1/1998 | Blonder et al. |
| 5,774,882 A | 6/1998 | Keen et al. |
| 5,852,775 A | 12/1998 | Hidary |
| 5,878,337 A | 3/1999 | Joao et al. |

(Continued)

FOREIGN PATENT DOCUMENTS

| | | |
|---|---|---|
| AU | 2005279689 | 3/2006 |
| EP | 2372867 | 9/2002 |

(Continued)

OTHER PUBLICATIONS

Wolf, Jim; "New Web Service Warns of Identity Theft;" www.greenspun.com/bboard/q-and-a-fetch-msg.tcl?msg_id=003yBJ; Oct. 23, 2000; printed May 4, 2011; 2 pages.

*Primary Examiner* — Lalita M Hamilton
(74) *Attorney, Agent, or Firm* — Kilpatrick Townsend & Stockton LLP

(57) ABSTRACT

Embodiments of the present invention are directed to a system and method for determining the products involved in a transaction, and transmitting messages containing product specific data. Systems may be implemented to product identifiers during payment processing. The messages may be sent including product identifiers, and further information regarding the products associated with the product identifiers.

24 Claims, 8 Drawing Sheets

(56) References Cited

U.S. PATENT DOCUMENTS

| | | |
|---|---|---|
| 5,903,830 A | 5/1999 | Joao et al. |
| 6,012,144 A | 1/2000 | Pickett |
| 6,049,778 A | 4/2000 | Walker et al. |
| 6,055,570 A | 4/2000 | Nielsen |
| 6,064,990 A | 5/2000 | Goldsmith |
| 6,067,529 A | 5/2000 | Ray |
| 6,185,200 B1 | 2/2001 | Prasad |
| 6,185,290 B1 | 2/2001 | Shaffer et al. |
| 6,185,541 B1 | 2/2001 | Scroggie et al. |
| 6,292,786 B1 | 9/2001 | Deaton et al. |
| 6,311,169 B2 | 10/2001 | Duhon |
| 6,330,550 B1 | 12/2001 | Brisebois et al. |
| 6,353,398 B1 | 3/2002 | Amin |
| 6,381,324 B1 | 4/2002 | Shaffer et al. |
| 6,418,436 B1 | 7/2002 | Degen et al. |
| 6,424,951 B1 | 7/2002 | Shurling et al. |
| 6,442,532 B1 | 8/2002 | Kawan |
| 6,484,148 B1 | 11/2002 | Boyd |
| 6,505,046 B1 | 1/2003 | Baker |
| 6,529,725 B1 | 3/2003 | Joao et al. |
| 6,535,855 B1 | 3/2003 | Cahill et al. |
| 6,553,100 B1 | 4/2003 | Chen et al. |
| 6,608,556 B2 | 8/2003 | De Moerloose et al. |
| 6,612,488 B2 | 9/2003 | Suzuki |
| 6,636,587 B1 | 10/2003 | Nagai et al. |
| 6,647,269 B2 | 11/2003 | Hendrey et al. |
| 6,684,195 B1 | 1/2004 | Deaton et al. |
| 6,741,188 B1 | 5/2004 | Miller et al. |
| 6,775,539 B2 | 8/2004 | Deshpande |
| 6,842,774 B1 | 1/2005 | Piccioni |
| 6,859,451 B1 | 2/2005 | Pasternack et al. |
| 6,873,972 B1 | 3/2005 | Murcial et al. |
| 6,879,838 B2 | 4/2005 | Rankin |
| 6,891,911 B2 | 5/2005 | Rostoker et al. |
| 6,912,398 B1 | 6/2005 | Domnitz |
| 6,913,194 B2 | 7/2005 | Suzuki |
| 6,970,850 B1 | 11/2005 | Freeny, Jr. |
| 6,993,326 B2 | 1/2006 | Link, II et al. |
| 7,003,497 B2 | 2/2006 | Maes |
| 7,024,211 B1 | 4/2006 | Martin |
| 7,024,396 B2 | 4/2006 | Woodward |
| 7,027,801 B1 | 4/2006 | Hall et al. |
| 7,028,052 B2 | 4/2006 | Chapman et al. |
| 7,092,724 B2 | 8/2006 | Fellenstein et al. |
| 7,096,003 B2 | 8/2006 | Joao et al. |
| 7,100,049 B2 | 8/2006 | Gasparini et al. |
| 7,167,830 B2 | 1/2007 | Sravanapudi et al. |
| 7,203,300 B2 | 4/2007 | Shaffer et al. |
| 7,310,534 B2 | 12/2007 | Northcutt |
| 7,337,119 B1 | 2/2008 | Geschwender et al. |
| 7,343,149 B2 | 3/2008 | Benco |
| 7,355,990 B2 | 4/2008 | Smith |
| 7,356,506 B2 | 4/2008 | Watson |
| 7,357,310 B2 | 4/2008 | Calabrese |
| 7,376,431 B2 | 5/2008 | Niedermeyer |
| 7,389,275 B2 | 6/2008 | Kemper et al. |
| 7,418,086 B2 | 8/2008 | Sravanapudi et al. |
| 7,597,254 B2 * | 10/2009 | Miller et al. .................. 235/383 |
| 7,729,988 B1 * | 6/2010 | Walker et al. .................. 705/44 |
| 7,792,709 B1 * | 9/2010 | Trandal et al. .............. 705/26.1 |
| 2001/0011245 A1 | 8/2001 | Duhon |
| 2001/0029485 A1 | 10/2001 | Brody et al. |
| 2002/0038255 A1 * | 3/2002 | Tarvydas et al. .............. 705/26 |
| 2002/0077964 A1 | 6/2002 | Brody et al. |
| 2002/0087460 A1 | 7/2002 | Hornung |
| 2002/0095380 A1 | 7/2002 | Singhal |
| 2002/0116322 A1 | 8/2002 | Schnall |
| 2002/0133462 A1 | 9/2002 | Shteyn |
| 2002/0198783 A1 | 12/2002 | Bates et al. |
| 2003/0061163 A1 | 3/2003 | Durfield |
| 2003/0105707 A1 | 6/2003 | Audebert |
| 2003/0182191 A1 | 9/2003 | Oliver |
| 2004/0039683 A1 | 2/2004 | McGeorge |
| 2004/0064401 A1 | 4/2004 | Palaghita |
| 2004/0078340 A1 | 4/2004 | Evans |
| 2004/0103049 A1 | 5/2004 | Kerr |
| 2004/0199470 A1 | 10/2004 | Ferry, Jr. et al. |
| 2005/0136949 A1 | 6/2005 | Barnes |
| 2005/0154665 A1 | 7/2005 | Kerr |
| 2005/0170814 A1 | 8/2005 | Joao et al. |
| 2005/0199775 A1 | 9/2005 | Kaminski et al. |
| 2005/0267809 A1 | 12/2005 | Zheng |
| 2006/0059110 A1 | 3/2006 | Madhok |
| 2006/0089905 A1 | 4/2006 | Song et al. |
| 2006/0200396 A1 | 9/2006 | Satterfield et al. |
| 2006/0202025 A1 | 9/2006 | Calabrese et al. |
| 2006/0277142 A1 | 12/2006 | McGeorge |
| 2006/0281439 A1 | 12/2006 | Benco et al. |
| 2007/0006286 A1 | 1/2007 | Singhal |
| 2007/0073593 A1 * | 3/2007 | Perry et al. .................... 705/26 |
| 2007/0100773 A1 | 5/2007 | Wallach |
| 2008/0004950 A1 | 1/2008 | Huang et al. |
| 2008/0010203 A1 | 1/2008 | Grant |
| 2008/0091552 A1 | 4/2008 | Aas |
| 2008/0147484 A1 | 6/2008 | Davis |
| 2008/0156869 A1 | 7/2008 | Carr et al. |
| 2008/0163257 A1 | 7/2008 | Carlson et al. |
| 2008/0182590 A1 | 7/2008 | Ruckart et al. |
| 2008/0183480 A1 | 7/2008 | Carlson et al. |
| 2008/0200144 A1 | 8/2008 | Ginsberg |
| 2008/0288385 A1 | 11/2008 | Geschwender et al. |
| 2009/0106846 A1 | 4/2009 | Dupray et al. |
| 2009/0144308 A1 | 6/2009 | Huie et al. |
| 2009/0201167 A1 * | 8/2009 | Tischer ..................... 340/686.6 |

FOREIGN PATENT DOCUMENTS

| | | |
|---|---|---|
| KR | 10-2002-0094340 A | 12/2002 |
| WO | 00/46769 | 8/2000 |
| WO | 01/93213 | 12/2001 |
| WO | 2006/024080 | 3/2006 |
| WO | 2009/026318 | 2/2009 |

* cited by examiner

MERCHANT COMPETITION ALERT

CROSS-REFERENCES TO RELATED APPLICATIONS

This patent application is a non-provisional of and claims priority to U.S. provisional patent application No. 61/173,371, filed on Apr. 28, 2009, which is herein incorporated by reference in its entirety for all purposes.

BACKGROUND

Transaction alert messages can be used to notify consumers that transactions have been conducted with their payment cards. For example, a person may receive an alert message regarding a recent transaction conducted at a gardening store. The alert message may contain transaction data such as the total amount of the transaction, the time the transaction occurred, and the name of the merchant.

The alert message may be sent to the person's mobile phone so that the person is notified that a transaction occurred. However, such messages may be limited by the data transmitted during the transaction. For example, the person may receive a message that she purchased forty-five dollars worth of goods at the gardening store, but she may not receive any indication of what, exactly, that money purchased. As such, the message may only give the transaction total, but not itemize the products or explain how much of the sale involved tax or other charges.

Such alert messages could be improved. Embodiments of the present invention address these problems and other problems individually and collectively.

BRIEF SUMMARY

Embodiments of the present invention disclosed herein include systems and methods for sending product alert messages. The alert systems can be implemented using one or more computer apparatuses and databases.

In exemplary embodiments, the product alert messages may include information specific to the products purchased by the consumer. Such specific information may include a listing of similar products sold for less by other merchants, suggestions on additional purchases, etc.

One embodiment of the invention is directed to a method comprising receiving a product identifier (such as a SKU or UPC) for a product purchased in a transaction conducted with a merchant, the product having a merchant price. The method further comprises accessing a database including product data associated with the product identifier, and generating, using a computer server, a product alert indicator (such as a listing of prices charged by other merchants), the product alert indicator including at least a portion of the product data associated with the product identifier. The method further comprises sending a product alert message to a user device, the product alert message including the product alert indicator. The product alert indicator may comprise product specific information, such as pricing or other data useful to the consumer.

Another embodiment of the invention is directed to a method of conducting a transaction with a merchant. The transaction is for a product having a merchant price, the product associated with a product identifier. The method includes receiving a product alert message at a user device, wherein the product alert message includes a product alert indicator, the product alert indicator including product data associated with the product identifier.

Another embodiment of the invention is directed to a system comprising a database, the database comprising product data associated with product identifiers for products. The system further comprises a server computer coupled to the database, wherein the server computer comprises a processor and a computer-readable medium coupled to the processor, the computer-readable medium comprising code executable by the processor for implementing a method. The method comprises receiving a product identifier for a product purchased in a transaction conducted with a merchant, the product having a merchant price, generating a product alert indicator using the product identifier, the product alert indicator including at least a portion of the product data associated with the product identifier, and sending a product alert message to a user device, the product alert message including the product alert indicator.

These and other embodiments of the invention are described in further detail below.

DETAILED DESCRIPTION

One embodiment of the invention is directed to a method for sending an alert message to a notification device operated by a person regarding a transaction for one or more products. The alert message may include line item product data. Such line item data may comprise detailed information broken out by the individual products purchased (i.e., not aggregated by total purchase as in conventional systems). The alert message may contain information regarding each product, including pricing, related products, or product seller information. For example, the alert message may contain merchant competition information, such as a list of nearby merchants that sell the product for a lower price. This information may be based upon a product identifier, such as a Stock Keeping Unit ("SKU") number or a Universal Product Code ("UPC").

Illustratively, a person may purchase a product from a first merchant at a first price using a payment card (such as a credit card), after which an alert message may be sent to the person's mobile phone. This alert message may contain product data for the purchased product, including the names of nearby merchants who sell the product for lower than the first price. The consumer can use this information, such as to request a refund from the first merchant for the price difference, prior to leaving the first merchant's premises. Alternatively, the consumer may return the product at the first merchant, and buy the same product at a different merchant for a lower price.

The alert message may contain other information related to the product identifier, such as warranty information or suggestions for complementary products. In another aspect, the messages may contain phone numbers or other links to contact the appropriate merchant(s). Using the product identifiers allows for highly targeted alerts that can include product specific information. This can allow for more useful alerts for consumers. Embodiments of systems and methods are described below in more detail with reference to the figures.

I. Systems

Figure 1:
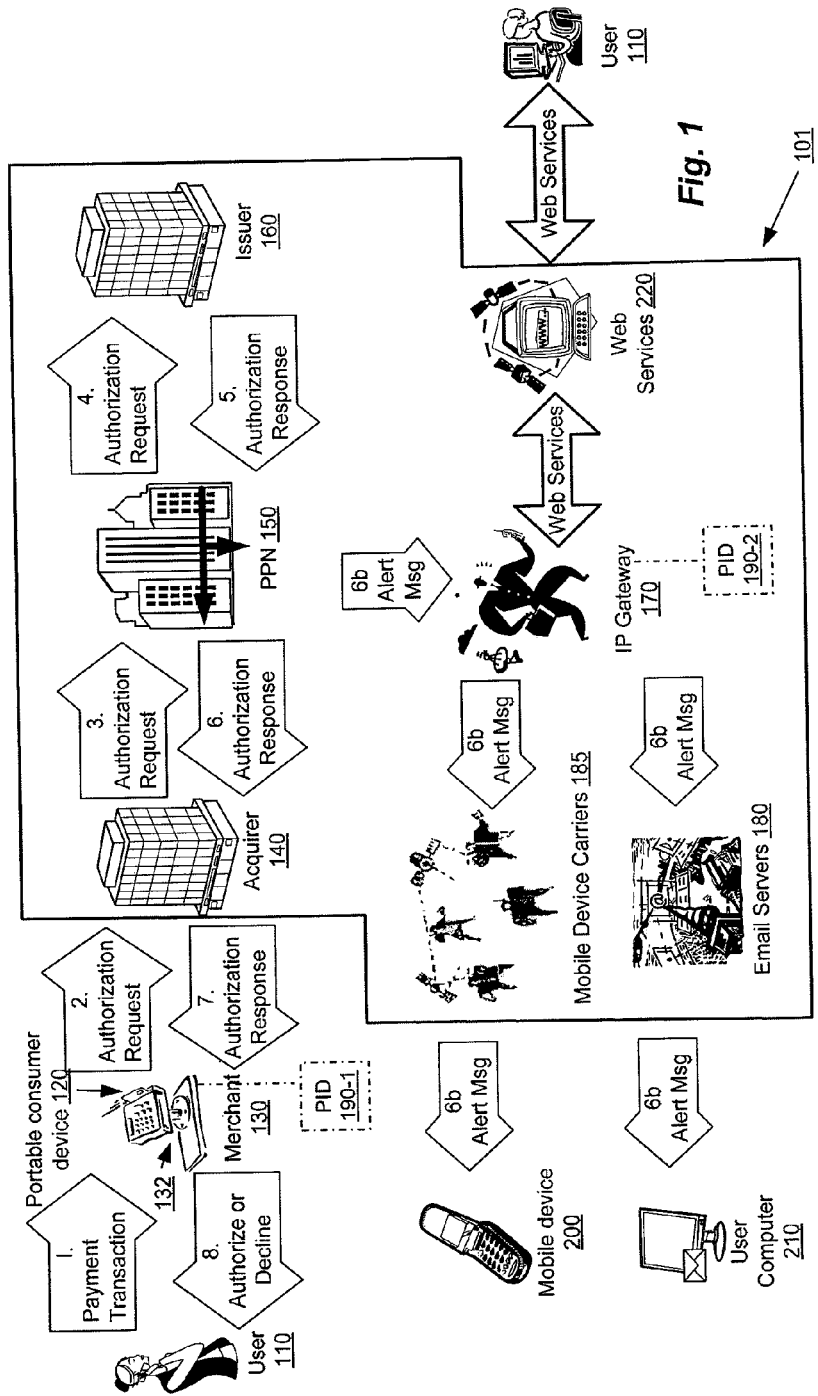
FIG. 1 shows a diagram of a alert system.

FIG. 1 is a diagram illustrating an alert system 100, in accordance with an embodiment of the invention. The alert system 100 includes a user 110, a portable consumer device 120, a merchant 130, an access device 132, an acquirer 140, a payment processing network 150, an issuer 160, an IP gateway 170, mobile device carriers 185, e-mail servers 180, a mobile device 200, a user computer 210, and Web services 220. The mobile device 200 and the user computer 210 are examples of user devices (e.g. notification devices). Further descriptions of notification devices and portable consumer devices are provided below.

The user 110 can be a consumer that uses the portable consumer device 120 to conduct a transaction, and may further operate one or more user devices, including the mobile device 200 which may comprise a mobile phone. The mobile device 200 operated by the user 110 may receive a transaction alert message after the user 110 conducts a transaction using her portable consumer device 120. The transaction alert message may contain information relating to the product identifier(s) for the products just purchased in the transaction. In one embodiment, the IP gateway 170 may store various product identifiers and related information in a database. The IP gateway may store the product identifiers and other product or merchant information in a product identifier database 190-2. When creating the product alert message, the IP gateway 170 can include this product identifier information, such that the user 110 can receive targeted information specific to the products purchased. In another embodiment, the product identifiers and other information may be stored outside the IP gateway 170, such as in product identifier database 190-1 which can be located at or near the merchant 130. The product identifier database 190-1 may be directly connected to nearby notification servers to generate and send product alert messages. The product identifier databases 190-1, 190-2 in FIG. 1 are shown with dashed lines, to indicate the database can be placed in either or both locations, depending on the embodiment.

The merchant 130 has an access device 132 for interacting with the portable consumer device 120, and the acquirer 140 is associated with the merchant 130. The acquirer 140 is in communication with the issuer 160 through the payment processing network 150.

The alert system 100 also includes an IP gateway 170 that is in communication with payment processing network 150. IP gateway 170 receives the transaction data from the payment processing network 150 and can generate alert messages. IP gateway 170 is also in communication with the mobile device carriers 185, e-mail servers 180, and Web services 220. The mobile device carriers 185 are in operative communication with the mobile device 200, and the mail servers 180 are in operative communication with the user computer 210. The alert messages that are generated from IP gateway 170 are sent to the mobile device carriers 185 and/or mail servers 180 to be sent to the user device (i.e., mobile device 200, and/or the user computer 210).

The web services 220 may be in operative communication with the user 110 for enrolling in the product alert messaging service provided by the alert system 100. The web services 220 may also be in communication with a merchant 130 for enrolling the merchant 130 in the product alert messaging service provided by the alert system 100.

The user 110 may be an individual or organization such as a business that is capable of purchasing goods or services or conducting any suitable transaction with the merchant 130.

The merchant 130 may refer to any suitable entity or entities that can conduct a transaction with the user 110. The merchant 130 may have a physical location which sells goods and services to the user 110. For example, the merchant 130 may use an e-commerce business to allow the transaction to be conducted by the merchant 130 through the Internet. Other examples of a merchant 130 include a department store, a gas station, a drug store, a grocery store, or other suitable business.

The access device 132 may be any suitable device for communicating with the merchant 130 and for interacting with the portable consumer device 120. The access device 132 can be in any suitable location such as at the same location as the merchant 130. The access device 132 may be in any suitable form. Some examples of access devices 132 include POS devices, cellular phones, PDAs, personal computers (PCs), tablet PCs, hand-held specialized readers, set-top boxes, electronic cash registers (ECRB), automated teller machines (ATMs), virtual cash registers (VCRs), kiosks, security systems, access systems, Websites, and the like. The access device 132 may use any suitable contact or contactless mode of operation to send or receive data from the portable consumer devices 120.

If the access device 132 is a POS terminal, any suitable POS terminal may be used and may include a reader, a processor, and a computer-readable medium. Reader may include any suitable contact or contactless mode of operation. For example, exemplary card readers can include radio frequency (RF) antennas, optical scanners, bar code readers, magnetic stripe readers, etc. to interact with portable consumer device 120.

The acquirer 140 refers to any suitable entity that has an account with the merchant 130. In some embodiments, the issuer 160 may also be the acquirer 140.

The payment processing network 150 refers to a network of suitable entities that have information related to an account associated with the portable consumer device 120. This information includes data associated with the account on the portable consumer device 120 such as profile information, data, and other suitable information.

The payment processing network 150 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. The server computer may use any of a variety of computing structures, arrangements, and compilations for servicing the requests from one or more client computers.

The payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 150 may use any suitable wired or wireless network, including the Internet.

The issuer 160 refers to any suitable entity that may open and maintain an account associated with the portable consumer device 120 used by user 110. Some examples of issuers may be a bank, a business entity such as a retail store, or a governmental entity.

The IP gateway 170 refers to an entity that generates and delivers notifications and contact alert messages to various delivery channels. The IP gateway 170 may include one or more servers and databases for generation of the contact alert messages and retrieval of data. The IP gateway 170 may be part of the payment processing network 150 or may be a separate entity in communication with the payment processing network 150.

The e-mail servers 180 are server computers configured to receive an e-mail from a network connection and store the e-mail in memory for future retrieval.

The mobile device carriers 185 refer to entities that provide wireless infrastructures for wireless data transfer and communication via cellular phone or other mobile devices. Example of such entities are AT&T™, Verizon Wireless™, T-Mobile™, etc.

The mobile device 200 may be in any suitable form. For example, a suitable mobile device 200 can be hand-held and compact so that it can fit into a consumer's wallet and/or pocket (e.g., pocket-sized). Some examples of a mobile device 200 include desktop, tablet, or laptop computers, cellular phones, personal digital assistants (PDAs), pagers, payment cards, security cards, access cards, smart media, transponders, and the like. In some embodiments, the mobile device 200 and the portable consumer device 120 are embodied in the same device. In some embodiments, the mobile device 200 (or other notification device) may comprise a processor, and a computer readable medium coupled to the processor. The computer readable medium comprises code, executable by the processor, for implementing a method comprising: receiving a product alert message at a user device, wherein the product alert message includes a product alert indicator, the product alert indicator including product data associated with the product identifier.

The user computer 210 may be a personal computer or a laptop. The User computer 210 may run an operating system such as Microsoft Windows™ and may have a suitable browser such as Internet Explorer™.

The web services 220 may be in the form of a server and a Website which allows users and merchants to enroll in the product alert messaging service. Web services 220 may be provided by the issuer 160 or the payment processing network 150.

Figure 2:
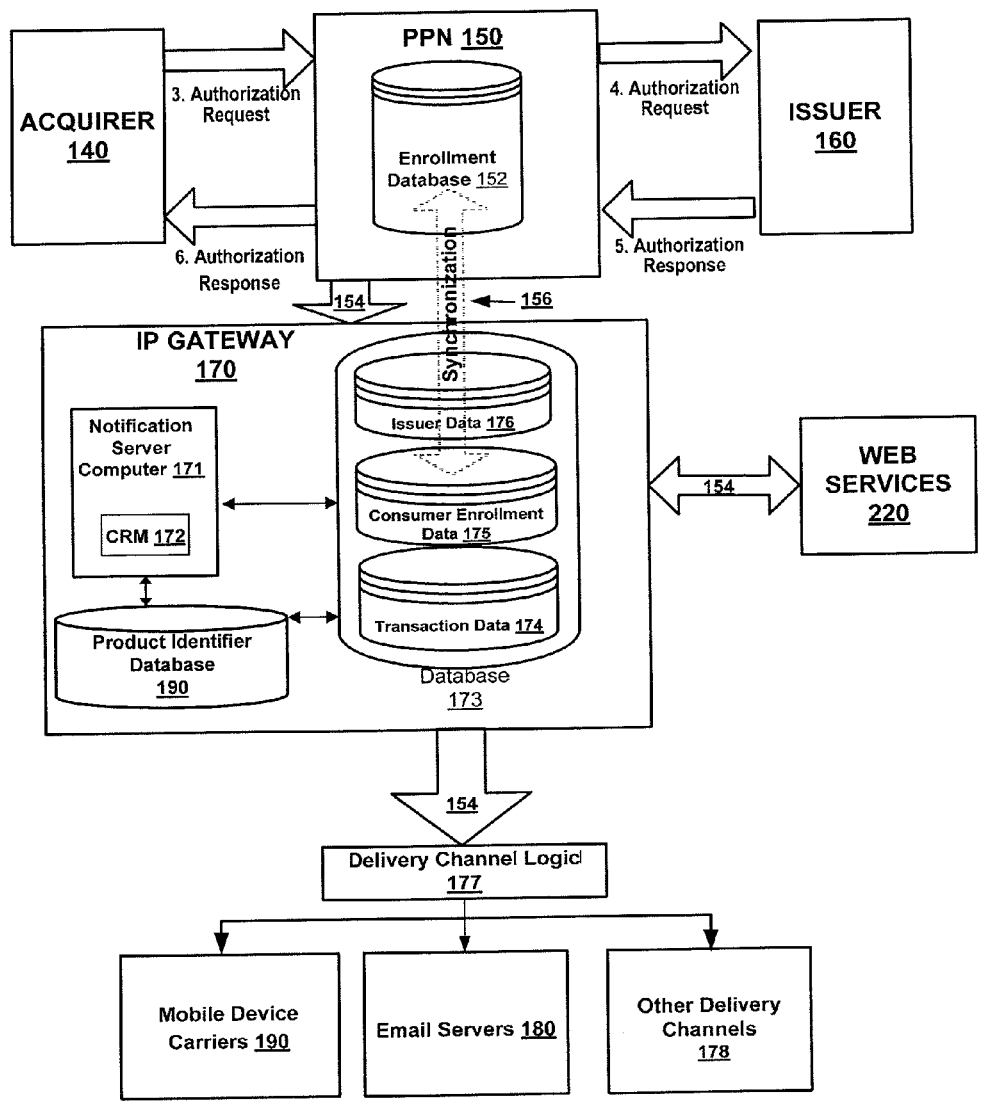
FIG. 2 shows a portion of the alert system in FIG. 1.

FIG. 2 is a diagram illustrating a subsystem 101 of the alert system 100. FIG. 2 illustrates more details about the IP gateway 170. The IP gateway 170 includes a notification server computer 171. The notification server computer comprises a processor and a computer-readable medium 172 coupled to the processor (not shown). The computer readable medium comprises code executable by the processor for implementing methods disclosed herein, including receiving a product identifier for a product purchased in a transaction conducted with a merchant, the product having a merchant price, accessing a database including product data associated with the product identifier, generating, using a computer server, a product alert indicator, the product alert indicator including at least a portion of the product data associated with the product identifier, and sending a product alert message to a user device, the product alert message including the product alert indicator.

The notification server computer 171 is in communication with a database 173. In some embodiments, database 173 may be included in the notification server computer 171. Database 173 contains transaction data 174, issuer data 176, and consumer enrollment data 175 (which may include alert preference data). Consumer enrollment data 175 may be synchronized with the enrollment database 152 in the payment processing network 150 via the synchronization link 156. The enrollment database 152 can contain data related to users who are enrolled in the product alert messaging service. As shown in FIG. 2, IP gateway 170 is in communication with payment processing network 150, and Web services 220 via the network connection 154 which may be in any suitable form. The network connection 154 may include, for example, at least a portion of the Internet. Delivery channel logic 182 can be in communication with IP gateway 170, and any or all of mobile service carriers 185, e-mail servers 180, and other delivery channels 178.

The notification server computer 171 can also be in communication with a product identifier database 190. In some embodiments, the product identifier database 190 can be a stand alone database (and may include hardware such as a hard drive and a controller such as a processor, not shown). In other embodiments, portions or all of the product identifier database 190 can be included in the notification server computer 171, or in the database 173. The product identifier database includes data regarding product identifiers, such as a listing of product identifiers cross indexed to product data and other information. For instance, when a user 110 buys a lawnmower at a first merchant, the payment processing network may forward the product identifier for the lawnmower to the IP gateway 170. The notification server computer 171 can use the product identifier to look up (i.e., determine) the associated product data in the product identifier database 190. The product identifier database 190 may indicate that two merchants sell the same lawnmower (i.e., a lawnmower having the same product identifier) for less than the first merchant. The IP gateway 170 can then prepare an alert message to the user 110, to provide her with this information.

In certain embodiments, the product identifier database 190 and/or the notification server computer 171 can be located within the IP gateway 170, and allow for centralized processing. In these embodiments, the merchant 130 can send the IP gateway 170 the product identifier, after which the alert may be processed and generated entirely by the IP gateway 170 or other centralized systems.

In other embodiments, all or portions of the IP gateway 170 and/or the product identifier database 190 may be located at the "edge" of the payment processing network 150 (e.g., locally, such as at, or close to, the merchant 130). U.S. patent application Ser. No. 11/171,516, filed Jun. 29, 2005, describes embodiments of systems located at the edge of a network, and is incorporated herein for all purposes. FIG. 1 shows embodiments where the product identifier database (and portions, or all, of the notification server computer 171) can be located at the network edge (190-1) or centrally (190-2). The product identifier databases 190-1, 190-2 in FIG. 1 are shown with dashed lines, to indicate the database can be placed in either or both locations, depending on the embodiment.

In certain embodiments, the product data may be determined and the alert message may be generated locally, by the edge system comprising product identifier database 190-1. In other embodiments, the alert message may be generated by a combination of edge and central processing. For example, edge systems comprising the product identifier database 190-1 may create an alias of the product identifier, and may send to the alias to the IP gateway 170 during the transaction. In another example, the edge systems may determine product data for the product purchased in the transaction. The edge systems may then send the product data to the IP gateway 170 during the transaction (and thus may not need to send the product identifier). Such processing will be disclosed in greater detail below.

Figure 3:
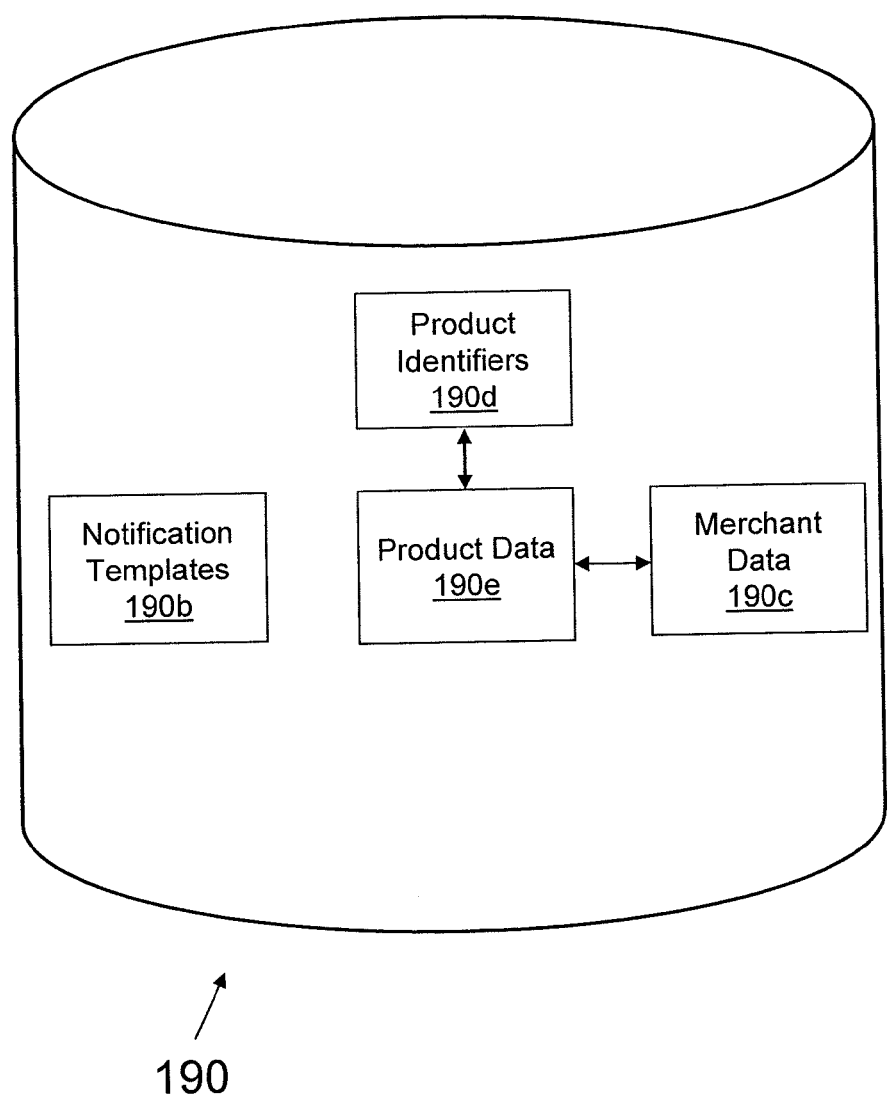
FIG. 3 shows a portion of a database of the alert system of FIG. 1.

Referring to FIG. 3, an implementation of the product identifier database 190 can contain notification templates 190*b*, merchant data 190*c*, product identifiers 190*d*, and product data 190*e*. The product identifier database 190 may contain other data, more data stores, or fewer data stores, in other implementations. In the implementation shown in FIG. 3, the product identifier database maintains a registry of product identifiers (product identifiers 190*d*) that is indexed to a database of product data (product data 190*e*). Thus, the product identifier database 190 can include a plurality of product identifiers and a plurality of product data, and each product identifier can be associated with its own stored product data. In this manner, a computer (such as the notification server computer 171) can receive a product identifier during a transaction, and easily look up the product identifier from the registry of product identifiers 190*d*, to determine the associated product data.

Product data 190*e* may include information about a specific product or product line. In certain implementations, the product data 190*e* can include a list of merchants that sell the product, the price each merchant charges, the merchant location, etc. This information can be used by the IP gateway 170 in FIG. 2 to easily create an indicator comparing available prices for the product. The indicator can be sent in an alert message to a consumer, to apprise the consumer of better deals. The product data may include other information about the associated product, such as consumer and expert ratings, product reliability information, data on competing products (such as from another manufacturer), etc. Embodiments of the invention can allow any or all of this information to be distilled into an easy to read product alert indicator, which can be sent to the consumer in an alert message.

The IP gateway 170 can locate the desired product data 190*e* stored in the database 190 by cross-referencing the data with its associated product identifier. The product identifiers 190*d* may be identifiers may be assigned by any suitable party (such as the merchant 130, a manufacturer, the payment processing network 150, etc.) and may be used to identify a product, product range, service, billable entity, trade item, etc. For instance, the product identifier may unique for each product, such that different products have different product identifiers, but different copies of the same product will have the same product identifier (e.g., a SKU number). In a second example, the product identifier may be a product line identifier that is assigned by the manufacturer to each product of a specific product line. In another example, the product identifier may be an individual product identifier that is specific to each individual product. Thus, two different copies of the same product may each have a different individual product identifier (such as a serial number). Other types of product identifiers may be used, such as product variant identifiers (i.e., each variant of a product model, such as different colored products, may have its own identifier), etc.

In one example, the product identifier can comprise the SKU number for a product. In this example, when a consumer purchases one or more products, the SKU number for each product can be correlated with its associated product data, and an alert message can be sent to the consumer containing at least a portion of this product data. If a consumer purchases a package of AAA batteries and a USB cable from a first merchant (such as an electronics store), two SKU numbers can be sent from the electronics store to the payment processing network 150—a first SKU number for the batteries, and a second SKU number for the USB cable. The product identifier database 190 can have a registry of SKU numbers (190*d*) which can be indexed to the product data 190*e*. The product identifier database 190 can therefore be accessed to determine the product data associated with the first and second SKU numbers. The associated product data may include a listing of a plurality of stores that sell products having the first or second SKU numbers, and the prices the products sell for. For instance, the determined product data may include three nearby (e.g., near to the consumer's user device) stores that sell the package of AAA batteries for a lower price than the first merchant, and four other nearby stores that may sell the USB cable for a lower price than the first merchant. An alert message can then be generated using this portion of the product data.

The product identifier database 190 may also include merchant data 190*c*. The merchant data 190*c* can be correlated to (i.e., searchable by reference to) the product data 190*e* or the product identifiers 190*d*. The merchant data 190*c* can include the names, contact information (phone numbers, email, website etc.), and store locations of merchants, along with other information such as a reliability score (i.e., the likelihood the merchant or specific store will go out of business), customer reviews, and other information useful to a consumer or other entity. Accordingly, the product identifier for a product purchased at a first merchant can be determined to have associated product data, which may include other merchants that sell the same product. This determined product data can be correlated, in turn, with merchant data regarding the merchants that sell the same product. In this manner, the notification server computer 171 (or other suitable processor) can use the product identifier received during a transaction to determine a variety of useful and valuable information related to the transaction.

The product identifier database 190 may further include a database of notification templates 190*d*. The notification templates can comprise one or more templates of product alert indicators and product alert messages that can be sent to the user 110. The templates 190*d* may contain a format for the indicator, such as "you purchased [product] at [store], for $[cost]. [Store] sells this for $[cost]." The templates 190*d* may also include formatting for product alert indicators. Thus, if the determined product data includes a listing of 20 stores, the notification template 190*d* may indicate to the server computer 171 that only the top three stores (e.g., the three stores selling the product for the least amount of money) may be the portion of the product data included in the product alert indicator. Once the product alert indicator is generated, it can be included in the alert message. This allows for efficient generation and formatting of alert messages to quickly and effectively convey product and merchant information to consumers. Other suitable templates are contemplated in embodiments of the notification templates database 190*d*. Each template in the plurality of stored templates may be associated with one or more alerts services. Thus, when a transaction has been qualified for a specific product alert message, the associated template may be used to generate a product alert message, and different customers may receive different alert messages depending on the programs and services they are enrolled in.

II. Methods

A. Conducting a Transaction

Referring to FIG. 1, a method of conducting a transaction according to an embodiment of the invention, such as a payment transaction, is shown with respect to system 100. In a typical payment transaction, a user 110 purchases goods or services at merchant 130 using the portable consumer device 120 (arrow 1). An authorization request message comprising transaction data is generated by a processor in the access device 132 after the portable consumer device 120 interacts with the access device 132. The authorization request message may comprise, for example, a transaction identifier, the BIN (bank identification number) and expiration date associated with the portable consumer device 120, the purchase amount, a transaction identifier (which can be used to reference the specific transaction) and a merchant code such as a merchant category code (MCC). The authorization request message may also include the one or more product identifiers of the one or more products purchased in the transaction (or alternatively, aliases that reference the product identifiers, etc). In one embodiment, the authorization request message may comprise the XML format. In other embodiments, other formats may be used. The authorization request message is then forwarded from the merchant 130 to the acquirer 140 (arrow 2). After receiving the authorization request message, acquirer 140 then sends the authorization request message to the payment processing network 150 (arrow 3).

The payment processing network 150 then forwards the authorization request message to the issuer 160 (arrow 4). After the issuer 160 receives the authorization request message, the issuer 160 sends an authorization response message back to the payment processing network 150 to indicate whether or not the current transaction is authorized (or not authorized) (arrow 5). The payment processing network 150 can then forward the authorization response message to the acquirer 140 (arrow 6). The acquirer 140 then sends the authorization response message to merchant 130 (arrow 7), and the transaction can continue, such as having the merchant 130 provide the purchased goods or services to the user 110 (arrow 8).

B. Sending a Product Alert Message

In exemplary embodiments, the one or more product identifier(s) may be sent from the merchant 130 to the payment processing network 150, as part of the authorization request message (arrows 2 and 3). If the account for the user 110 is enrolled in the product alert messaging service, the payment processing network 150 sends the transaction data (i.e., product identifier(s), user account number, and other pertinent data from the authorization request message) to the IP gateway 170, which may include the product identifier database 190-2 (arrow 6b).

In one example, the authorization request message may include the product identifier in previously unused space (e.g., data bits) of the authorization request message. In another embodiment, the authorization request message may be increased in size to accommodate the product identifier. In some embodiments, portions of the authorization request message (such as the transaction identifier) may reference the product identifiers.

In further embodiments of the invention, a hashing algorithm may be used on all or portions of the product identifiers, to reduce the data footprint prior to sending as part of the authorization request message. In some systems, only a portion of the product identifier may be needed to determine the associated product data, so only this needed portion may be transmitted during transaction processing. In some embodiments, compression and/or encryption may be applied to the product identifiers or any other suitable portion of the message. In exemplary embodiments, the notification sever computer 171 may parse the authorization request message to determine the product identifier, which can then be used to generate the product alert message as described herein.

In certain embodiments, the product identifiers may be sent to the payment processing network 150 separately from the authorization request message. For instance, during an online (e.g., web based) transaction, the online merchant may send a first message comprising an authorization request message, and a second message comprising the product identifiers, both to the payment processing network 150.

In order for the payment processing network 150 to determine whether the transaction is associated with a portable consumer device 120 that is enrolled in the product alert messaging service, the payment processing network 150 can maintain a list of account numbers associated with consumers who are enrolled in the product alert alert messaging service in the enrollment database 152. The data in the enrollment database 152 can be synchronized with the appropriate portion(s) of the consumer enrollment data 175 via a synchronization link 156 which may be in any suitable form. For example, the synchronization link 156 may be in the form of local area network connection or Internet.

After the IP gateway 170 receives the transaction data 174 from payment processing network 150, the notification server computer 171 can begin the process of generating a product alert message for that transaction. During this process, regular processing for transaction authorization continues as normal with the issuer 160, while at the same time the product identifiers can be inspected and the associated product data can be determined. The product alert alert message is generated and is delivered (arrow 6b) in real time or near real time to the notification device operated by user 110. Many times, the contact alert message is received before user 110 leaves a checkout counter at the merchant 130.

In other exemplary embodiments, the product identifiers may be analyzed closer to the merchant location, such as at an edge system comprising the product identifier database 190-1, as described above. For instance, the edge system may generate a product alert indicator comprising information to be sent to the user 110 regarding her recent purchase. The edge system may then generate an authorization request message that references the product alert indicator, and send this authorization request message to a notification server computer for transmission to the user 110.

In some implementations, the edge system can determine product data, and forward portions or all of this determined product data to the IP gateway 170 for inclusion in an alert message. In some implementations, the edge system comprising the product identifier 190-1 may transform the product identifiers involved in the transaction into alias identifiers (i.e., shorter or easier to transmit numbers, such as by hashing or the use of lookup tables). The alias identifiers may be transmitted to the payment processing network as part of the transaction identification number, or other portion of the authorization request message. In other implementations, the edge system may include an edge IP gateway, which can both determine the product data and also generate and transmit the product alert message, directly to the user 110. In some of these implementations, the edge systems can include portions or all of the product identifier database 190 (as seen in FIG. 3), the systems and data of the IP gateway 170, as well as an enrollment database. In other embodiments, the edge systems may maintain synchronized copies of the centrally located systems.

Figure 4:
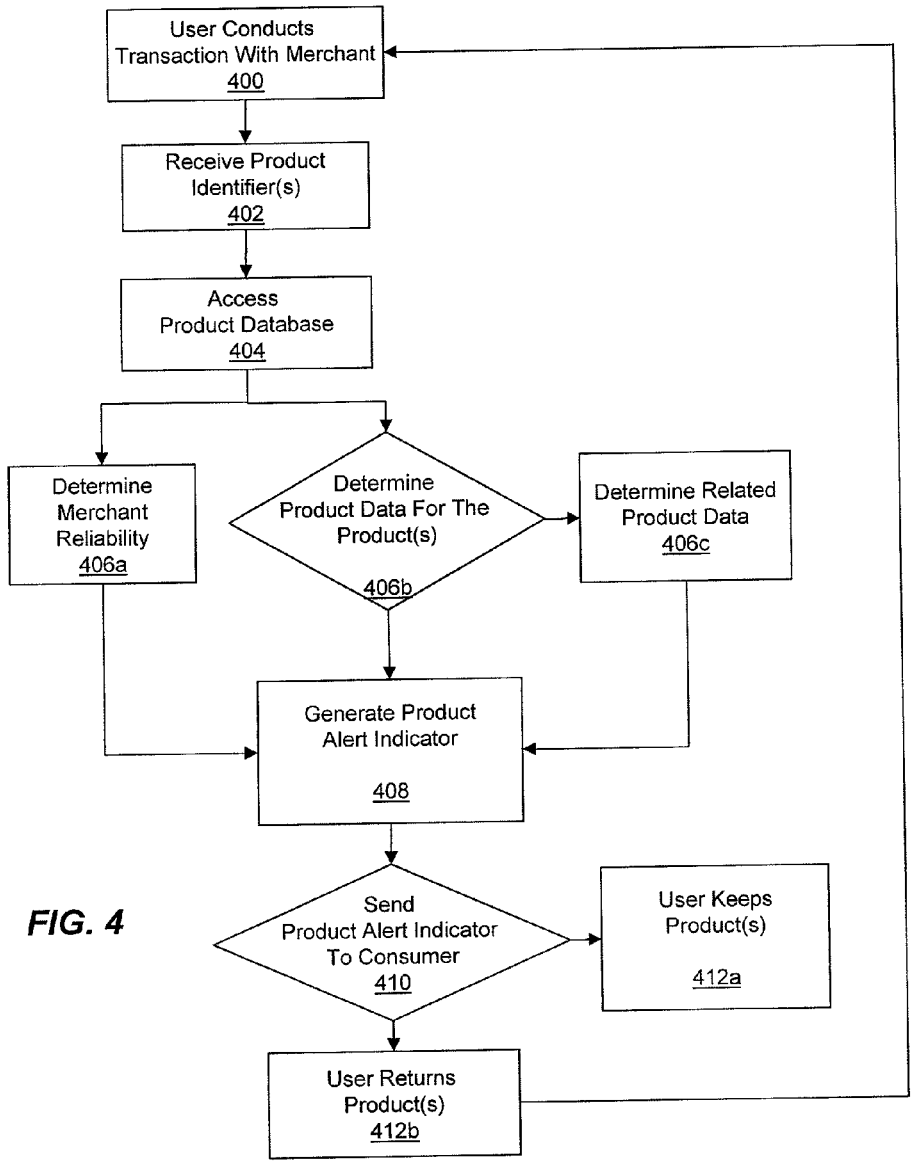
FIG. 4 shows a flowchart illustrating the steps involved when a consumer conducts a transaction

FIG. 4 shows certain embodiments of methods of creating and sending product alert messages. For instance, a consumer 130 may purchase a plurality of products, each with an associated product identifier, from a first merchant. Each product has a product identifier, and a merchant price (i.e., the price a given merchant will sell the product for). Thus, each product can have a first merchant price with a first merchant, a second merchant price with a second merchant, and so on. In certain embodiments of the invention, each product will have only one product identifier, so that each merchant can reference the product using the same product identifier as another merchant.

The method of FIG. 4 may be performed using the product identifier database 190-1, the product identifier database 190-2, or a combination of the two. In one embodiment, the product identifier database 190-1 may be synchronized with the product identifier database 190-2. For clarity of description, the steps of the method of FIG. 4 will be explained with reference to a central product identifier database 190-2. However, one skilled in the art would contemplate all or some of the steps of the method of FIG. 4 being performed with the product identifier database 190-1 based upon the description herein.

Referring to FIG. 4, after a consumer 130 conducts a transaction with a first merchant in step 400, the notification server computer 171 can receive the one or more product identifiers for the one or more products purchased in the transaction (step 402). Each product has a merchant price (i.e., a first merchant price) charged by the first merchant. In step 402, the received plurality of product identifiers, along with the transaction data such as the prices, can be sent in the transaction authorization message to the notification server computer 171. For example, the consumer may have purchased two products from the first merchant—a shirt and a jacket. The first merchant price for the shirt may be $15, and the first merchant price for the jacket may be $150. The notification server computer 171 can receive a transaction authorization message that includes the $15 and $150 prices of the shirt and jacket, respectively, as well as a first product identifier for the shirt and a second product identifier for the jacket.

In step 404, the notification server computer 171 can access the product identifier database 190. Such accessing may comprise the step of sending a message to the database to start communication, or may comprise the initial string of a search command. In other embodiments, step 404 may comprise accessing a remotely located product identifier database 190, and can include identifying the database location, validating access and security information, etc. The notification server computer 171 can then use the one or more received product identifiers to determine the pertinent data, for use in a product alert message, in steps 406a-c. In exemplary implementations, the notification server computer 171 can look up each received product identifier in the product identifier registry 190d. Each identifier in the registry can be correlated with its associated product data 190e and the proper merchant data 190c.

In step 406b, the notification server computer 171 can then determine the product data associated with the one or more products purchased in the transaction, such as by determining which product data 190e is associated with the received product identifiers for the transaction. In exemplary embodiments of the invention, the determined product data can comprise "transaction product data" (i.e., the product data associated with the product identifiers of the products involved in the transaction). The notification server computer 171 can include all or a subset of this transaction product data in the product alert message.

The transaction product data may include product pricing data. This product pricing data can comprise information relating to the sales prices of the products with other merchants, including the contact information of the merchant and the prices. In the above example, the transaction product data may include six merchants, including the first merchant, that sell the shirt (i.e., six other merchants are listed in the database as selling a product having the first product identifier); the transaction product data may also may include four merchants, not including the first merchant, that sell the jacket (i.e., four other merchants are listed in the database as selling a product having the first product identifier). From the transaction product data, the notification server computer 171 can determine that two merchants sell the shirt for a price that is lower than the first merchant price of the shirt, and three merchants may sell the jacket for a price that is lower than the first merchant price of the jacket. This portion of the transaction product data can be included in the product alert indicator that is sent to the user 110.

The transaction product data may also include information regarding related products that the consumer 130 may wish to purchase. Related products (i.e., complementary products) may include additional services (such as an extended warranty), products designed to work with the purchased products (e.g., related electronics, such as an extended memory card for a purchased camera), products by the same manufacturer, products bundled with the purchased products as a sales promotion, etc. In certain implementations, predictive modeling may be used to determine what related product data may interest the user 110. The predictive modeling may be based upon the product data and the prior transaction history of the user 110. In step 406c, the notification server computer 171 can read the product data to determine if there are any related products. For example, the product data for the shirt purchased by the consumer may not indicate any related products. However, the product data for the jacket purchased by the consumer 130 may include a reference to a matching scarf. Thus, in step 406c, the notification server computer 171 can access the product data 190e to determine the description, price, and seller of the matching scarf, any or all of which may be included in the product alert indicator.

In some embodiments of the invention, the transaction product data can also indicate that the user 110 would be interested in the reliability of the merchant 130. For example, the product purchased from the merchant 130 could be an extended warranty or a continuing product like a series of classes. In such event, the user 110 would want to know if the merchant is likely to go out of business, or if the merchant has received bad customer service reviews. In step 406a, the notification server computer 171 can review information stored on the merchant 130, by looking up the merchant data 190c. In this way, the notification server computer 171 can determine the merchant reliability for inclusion in the product alert indicator. For example, the merchant data 190c may indicate that merchant 130 has a 65% chance of declaring bankruptcy in the next twelve months.

The notification server computer 171 can accordingly analyze the merchant data 190c to determine a reliability assessment of the merchant 130 in step 406a. In some embodiments, the merchant data 190c may assign a numerical value (such as a percentage or credit score) to the merchant, to indicate the reliability assessment of the merchant. In certain implementations, the notification server computer 171 may determine the merchant reliability by converting the merchant data 190c into an easy to understand rating. In one example, the merchant data 190c may assign a bankruptcy mark to the merchant 130, from 1 (not likely to declare bankruptcy) to 300 (likely to declare bankruptcy). The notification server computer 171 can convert, or "distill," this numerical value to one of three ratings: very reliable (correlating to a mark of 1-100), reliable (correlating to a mark of 101-200), or not reliable (correlating to a mark of 201-300). The notification server computer 171 can include the applicable rating (e.g., very reliable, reliable, not reliable) in the product alert indicator.

After determining the product data (including the pricing product data and the related product data) and optionally the merchant reliability data, the notification server computer 171 can generate a product alert indicator in step 408. The notification server computer 171 can select all or portions of the product data and (optionally) the merchant reliability data for use in the product alert indicator. For the purchase of the shirt and jacket described above, the notification server computer 171 can select to include a portion of the product data—only two of the six listed shirt merchants in the indicator, and three of the four listed jacket merchants may be included. In this example, the notification server computer 171 can include only the merchants that sell each product for less than the first merchant price paid by the user 110. The notification server computer 171 may also include the related product data (e.g., the matching scarf) in the notification product alert indicator.

The selected data can then be formatted into a product alert indicator. In exemplary embodiments of the invention, the product alert indicator is information sent to the user 110 in the product alert message. The product alert indicator may include the selected data (i.e., selected product data, selected merchant reliability data, etc.) along with formatting provided by the proper notification template. The notification server computer 171 may select the proper notification template from the database of notification templates 190b. The selection criteria for the proper template may depend on any or all of the selected product data (e.g., number of merchants to list with lower prices, whether or not there is merchant reliability data or related product data, etc.), the rules of the product alert messaging service that the user 110 is enrolled in, and rules provided by the merchants involved.

Once the proper notification template is selected, the template can be filled in with the appropriate data to generate the product alert indicator in step 408. In one example, regarding the shirt and jacket transaction described above, the proper notification template may comprise two separate templates, for two separate product alert indicators (i.e., one indicator per product). These two indicators may be sent in the same product alert message, or in two separate messages. In another example, a single template may be used and the generated product alert indicator can include data on both the first product and the second product.

For example, the first template may comprise "You purchased [product] at [store1], for $[cost]. [Store2] sells this for [cost], and [store3] sells this for $[cost]." The second template may comprise "You purchased [product1] at [store1], for $[cost]. [Store2] sells this for $[cost], [store2] sells this for $[cost], and [store3] sells this for $[cost]. Also, you may be interested in [product2], which [store1] sells for $[cost]." These templates may be filled in with the selected data described above, to generate a first and a second product alert indicator, respectively. Thus, the first product alert indicator may comprise "You purchased one shirt at Macy's, for $15.00. Kohls sells this for $14.50, and Target sells this for $12.95." The second product alert indicator may comprise "You purchased one jacket at Macy's, for $150.00. The GAP sells this for $149.99, Sears sells this for $132.25, and Club Banana sells this for $124.00. Also, you may be interested in a matching scarf, which Macy's sells for $ 35.00."

The notification server computer 171 may also access other resources to further enhance the product alert messages. These resources may be in the form of translation tables or reference tables for abbreviations and symbols. Such resources may be part of the product identifier database 190, be stored in notification server computer 171, or be stored in a remote location. In some embodiments, the contact alert messages are translated into a language spoken by the user 110. During the enrollment process, the user 110 may be provided with the option of receiving the contact alert messages in her native language.

The notification server computer 171 may then send each product alert indicator to the consumer (step 410). The notification server computer 171 may send a product alert message to a user device (e.g. mobile device 200) associated with the consumer, and this product alert message can contain one or more product alert indicators. In the above example, the notification server computer 171 may send the first product alert indicator in a first product alert message to the user 110, and may send the second product alert indicator in a second product alert message to the user 110. In alternative embodiments, both the first and second product alert indicators may be sent in a single product alert message.

The product alert message may show the user 110 that, while she paid a first merchant price for the product, a second merchant sells the product for a second merchant price that is lower than the first merchant price. The product alert message may also include product data that states an approximate distance from the user device (or first merchant) to the second merchant, along with a reliability assessment of the first merchant. After receiving the product alert message for the recently purchased product, the user 110 may have a choice-keep the product, or return the product and purchase the same product for less money at a different merchant. The user 110 may choose to keep the product (step 412a) for a variety of reasons. For instance, the user 110 may earn rewards by shopping at the first merchant, the other merchants may be too far away, etc. The user 110 may also use the information provided in the product alert message to negotiate a rebate of the price difference from the first merchant.

The user 110 may also return the product to the first merchant, in step 412b. The user 110 can then (or prior to the returning step 412b) purchase the same product at one of the other stores indicated in the product alert message, starting the process over again. After the consumer purchases the same product at a second merchant, another product alert message can be generated and sent to the user 110, with information on other merchants. In certain implementations, the user 110 may only be sent one product alert message per product purchased in a given time period. By limiting the messages sent, the consumer will not get overwhelmed by messages with repetitive data. However, the user 110 may wish to receive a product alert message for each purchase, as prices and merchants can change. The user 110 can save such messaging preferences when registering for the product alert messaging system, or at other times (such as through a web interface).

Figure 5A:
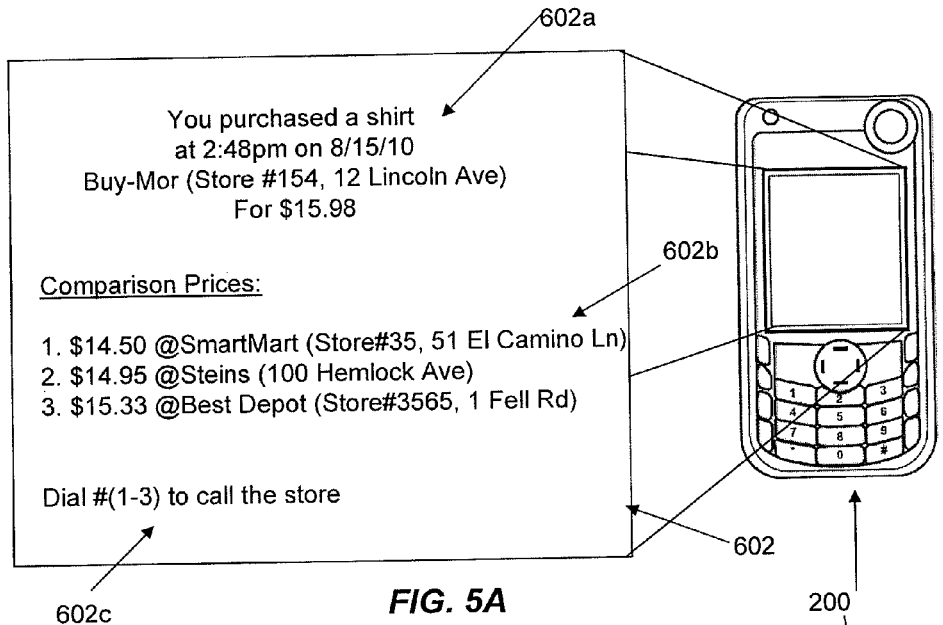
FIGS. 5A-5B show illustrations of product alert messages according to an embodiment of the invention.
Figure 5B:
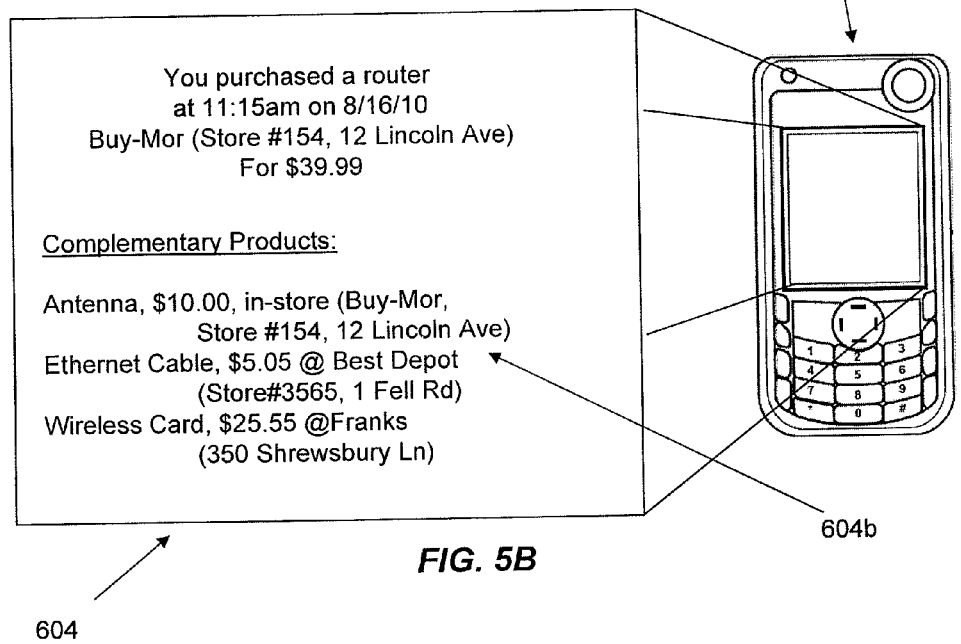

FIGS. 5A and 5B show examples of product alert messages containing line item product data, according to certain embodiments of the invention. In FIG. 5A, a user device, such as a mobile phone associated with a user 110, has received a product alert message 602. The product alert message 602 includes a listing of nearby merchants that sell the product recently purchased, for a lower cost. The product alert message 602 can include a description 602a of the product purchased by the consumer 602. The product alert message 602 can also contain a product alert indicator 602b that includes product data regarding other merchants that sell the product and the associated merchant prices. Furthermore, the product alert message 602 can contain a link or other contact information 602c, to allow the user 110 to contact the appropriate merchant. In some embodiments, the contact information 602c can be a selectable link (e.g., a hyperlink) that is selectable by clicking on the merchant name or address. These embodiments may be compatible with smartphbnes or certain touch-screen devices.

In FIG. 5B, the mobile device 200 has received a product alert message 604. The product alert message 604 includes a listing of products related (i.e., complementary) to the product recently purchased by the user 110. This product alert message 604 can contain a product alert indicator 604b that lists the related products, and what merchants sell them. Although not shown, the product alert message 604 may also include selectable contact information, to allow the user 110 to easily contact any of the listed merchants.

The product alert message 602 may be generated using a first product alert message template, such as a template designated for comparison shopping. The product alert message 604 may be generated using a second product alert message template, such as a templated designated for related products. Embodiments of the invention also contemplate product alert messages containing some or all the information shown in both product alert messages 602 and 604. The messages may also include other information as described herein, such as merchant reliability data.

C. Enrollment

In certain embodiments of the invention, prior to sending product alert messages, the product alert messaging service may first have one or more parties enrolled, and the databases and systems set up. In exemplary embodiments, there may be a program manager that coordinates the product alert messaging service. In certain embodiments, the program manager may be the payment processing network 150, or an entity that is affiliated with the payment processing network 150. In other embodiments, the program manager may comprise the issuer 160, the acquirer 140, or other suitable entity.

Figure 6:
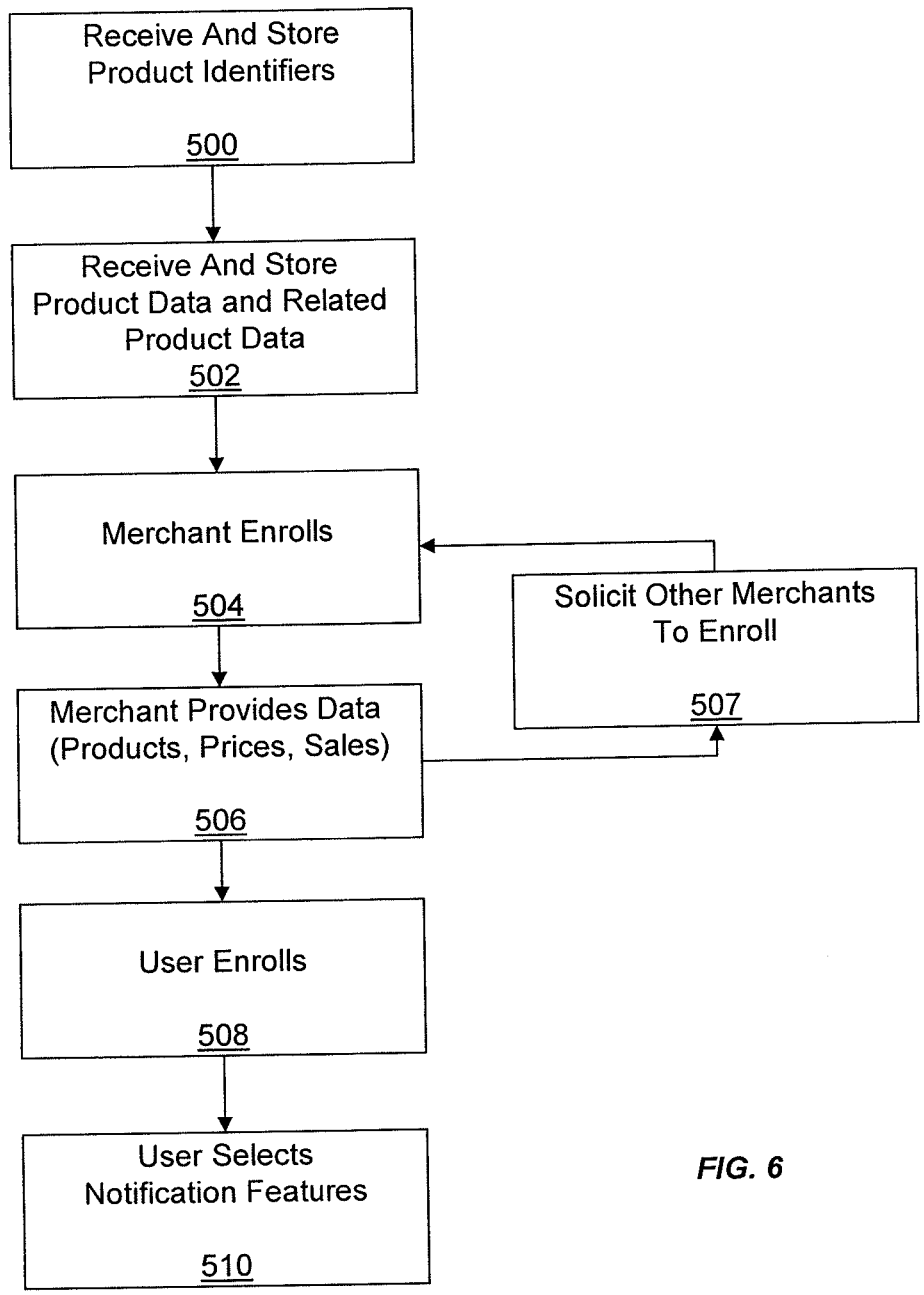
FIG. 6 shows a flowchart illustrating the steps involved in enrolling a consumer in an alert service.

FIG. 6 shows a method of enrolling both consumers and merchants in a product alert messaging service, according to an embodiment of the invention. In order to receive the product alert messages associated with a transaction, the user 110 enrolls in the messaging service provided by the alert system 100. Similarly, the program manager may receive and store the information to be used in the product alert messages, such as product identifiers, product data, etc. This process will be explained in further detail below with reference to the method of FIG. 6.

The product alert messaging service may receive and store product identifiers (step 500). In exemplary embodiments, the program manager may have agreements with manufacturers and merchants to periodically receive (e.g. daily, monthly, quarterly, etc.) product identifiers. For example, a manufacturer may maintain a computer database of all the products the manufacturer produces, along with the associated product identifiers. The manufacturer may have a computer automatically transfer (i.e., upload) the information in this database at regular intervals to the product identifier database 190, or whenever the manufacturer database is updated. The database information can be transferred over a suitable computer network, such as the Internet or the payment processing network 150. In some implementations, the manufacturer may only upload the changes to the database.

The product alert messaging service may also receive and store the product data, including related product data, in step 502. In certain implementations, steps 500 and 502 may happen simultaneously. That is, the product alert messaging service may receive the product identifiers at the same time as the associated product data for each product identifier. An example is when a merchant transmits SKU numbers (i.e., product identifiers) along with pricing information for the products (i.e., product data), to the product alert messaging service. The program manager can store the product data, indexed to the registry of product identifiers, in the product identifier database 190.

A merchant may enroll in step 506. In certain embodiments, the program manager may solicit the merchant to enroll. Merchants may enroll in the product alert message program to better advertise their products for sale, to provide further services to their customers, or for the other benefits the service provides. In certain implementations, some merchants may not need to enroll themselves in the service. Rather, the merchant may be enrolled by the program manager in steps 504 and 506 from other data. For example, data regarding the merchant's products and prices may be gathered from third party sources such as newspaper ads, online inventory listings (e.g., website sales portals), manufacturer orders, etc. This data can then be input into product identifier database 190.

If the merchant enrolls itself in the product alert messaging service in step 504, the merchant may provide the program manager with merchant identifying information, such as merchant name, store location(s), phone number contact information, email addresses, etc. Then, the merchant can provide, in step 506, product data for the products the merchant sells. This product data can include the product identifiers for the products (such as UPC codes assigned by the merchant or manufacturer), the merchant price for each product, whether certain stores carry the product, future sales or promotions, etc. The merchant may upload this information directly to the product identifier database 190 (such as through a web interface, FTP, or other direct link), or may transmit this information to the program manager (by FTP, email, etc.). The program manager can then store the product data provided by the merchant, in the product identifier database 190.

The program manager may also solicit other merchants to enroll themselves in step 507. The program manager may select merchants to solicit from given lists, such as the list of merchants that sell a product from a given manufacturer, merchants that are listed in a database such as the better business bureau, or that have a relationship with the program manager. In some implementations, the program manager may determine other merchants to solicit based on the product data received in step 506. For example, a first merchant may provide product data that refers to a first product sold by the first merchant. The product data may also state that a second product is related to the first product, and is sold by a second merchant. The program manager can then solicit the second merchant to enroll in the product alert message program (step 507), to increase the network effects of the program and provide greater customer exposure to more merchants.

The user 110 may enroll in the product alert program, in step 508. Step 508 may occur before, after, or concurrently with merchant enrollment. There may be multiple ways in which the consumer may become enrolled in the product alert program. In some embodiments, the user 110 may be enrolled automatically by the issuer 160 that issues the portable consumer device 120. Enrollment for the user 110 may also be done in a batch mode, by file delivery from issuer 160 or by file delivery from some other party. In other embodiments, issuer 160 or payment processing network 150 may provide the messaging service as an option to the user 110 at which time the user 110 may enroll in the messaging service either by contacting a customer service representative over the phone (provided either by issuer 160 or payment processing network 150), or by accessing a web site and filling out an online application.

In one embodiment, the user 110 may also select notification features (i.e., alert preferences) during the enrollment process (step 510). The user 110 may set notification features such as the language preference and preferred delivery channels of the contact alert message. For example, the user 110 may specify during the enrollment process that she would like to receive the product alert messages in a particular language. The user 110 may also specify whether the alert message will be send to a person on his mobile device 200, or at a particular e-mail address. In certain embodiments, the consumer can specify when to receive a product alert message. For example, the user 110 may select to only receive product alert messages for specific types of products, such as items of clothing, electronics, etc. The consumer may also select to receive product alert messages for specific product indicators (e.g., the consumer enters the specific product identifier), or groups of product identifiers (e.g., SKU categories). The user 110 may also select to receive only alerts regarding merchant reliability or related product, or may select not to receive any of these types of alerts. In some implementations, the user 110 may select the number or frequency of product alert messages she may receive for a particular product (e.g., for a specific product identifier). Thus, the user 110 may choose to only receive one product alert message per week for a given product. In another example, the consumer may choose to only receive up to five product alert messages for a given product. In exemplary embodiments, the user 110 can select from any or all of the above preference options.

The information that the user 110 provides can be stored in the database 173 in the form of consumer enrollment data 176, as shown in FIG. 2. In other embodiments, the information can be stored in other locations, such as the product identifier database 190, or in a mix of locations, such as both database 173 and database 190. The data, sometimes referred to as product alert preference data, in addition to the product data 190e and merchant data 190c, can be used by the notification server computer 171 to generate the product alert messages.

III. Portable Consumer Devices and Computer Apparatuses

Figure 7:
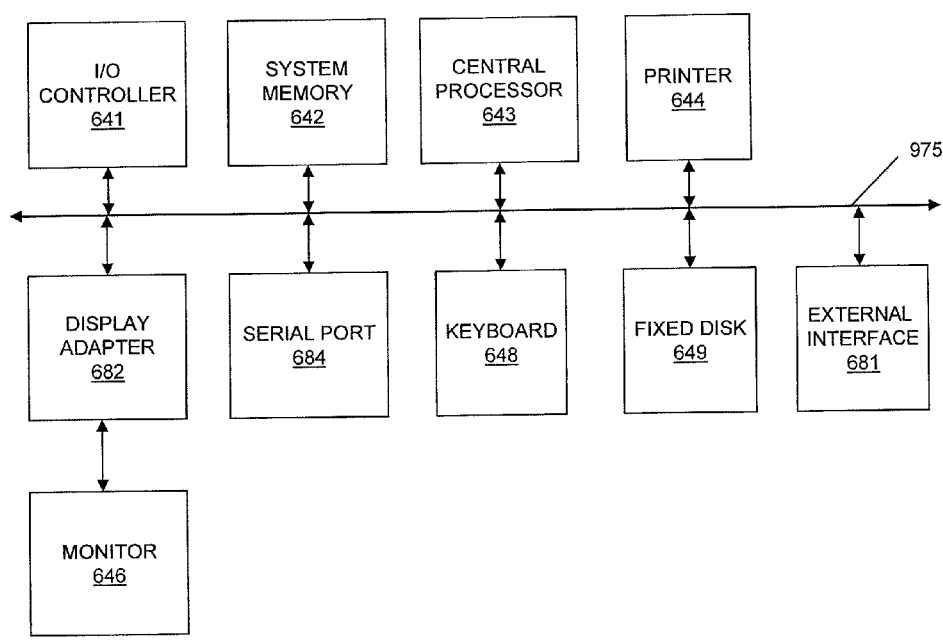
FIG. 7 shows a high-level block diagram of a computer apparatus.

The various participants and elements in FIGS. 1 and 2 may operate one or more computer apparatuses to facilitate the functions described herein. Any of the elements in FIGS. 1 and 2 may use any suitable number of subsystems to facilitate the functions described herein. Examples of such subsystems or components are shown in FIG. 7. The subsystems shown in FIG. 7 are interconnected via a system bus 645. Additional subsystems such as printer 644, keyboard 648, fixed disk 649, monitor 646, which is coupled to display adapter 682, and others are shown. Peripherals and input/output (I/O) devices, which couple to I/O controller 641, can be connected to the computer system by any number of means known in the art, such as serial port 684. For example, serial port 684 or external interface 681 can be used to connect the computer apparatus to a wide area network such as the Internet, a mouse input device, or a scanner. The interconnection via system bus 645 allows a central processor 643 to communicate with each subsystem and to control the execution of instructions from system memory 642 or fixed disk 649, as well as the exchange of information between subsystems. The system memory 642 and/or fixed disk 649 may embody a computer readable medium, such as a tangible (i.e., physical or durable) computer readable medium. The computer readable medium may take the form of a hard drive, flash memory, magnetic strip, optical device, or other memory.

Figure 8:
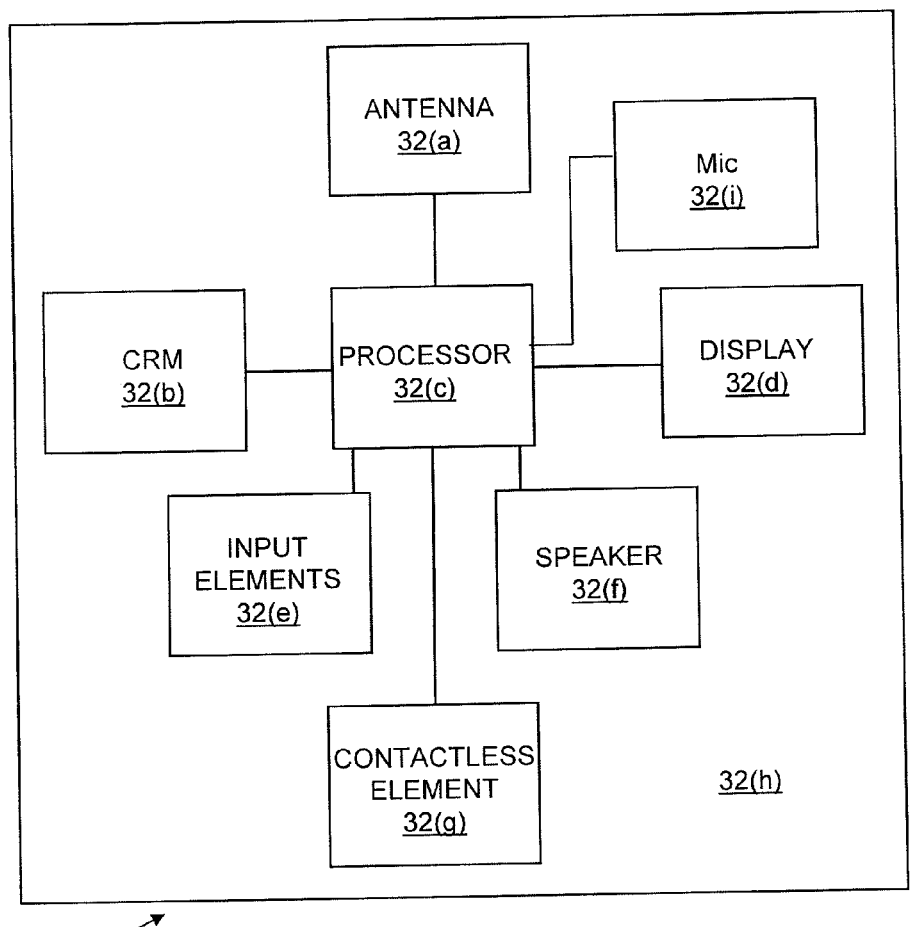
FIG. 8 shows a block diagram of a mobile device.

FIG. 8 shows block diagram of a mobile device, such as a wireless phone, and subsystems that may be present in computer apparatuses in systems according to embodiments of the invention. An exemplary portable consumer device 500 in the form of a mobile device may comprise a computer readable medium and a body as shown in FIG. 8. (FIG. 8 shows a number of components, and the portable consumer devices according to embodiments of the invention may comprise any suitable combination or subset of such components.) The computer readable medium 32(*b*) may be present within the body 32(*h*), or may be detachable from it. The body 32(*h*) may be in the form a plastic substrate, housing, or other structure. The computer readable medium 32(*b*) may be a memory, such as a tangible (i.e. physical or durable) memory that stores data and may be in any suitable form including a hard drive, magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile device 500 may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 500 and an interrogation device. Thus, the portable consumer device 500 is capable of communicating and transferring data and/or control instructions via both cellular network and near field communications capability.

The portable consumer device 500 may also include a processor 32(c) (e.g., a microprocessor or a group of processors working together) for processing the functions of the portable consumer device 500 and a display 32(d) to allow a consumer to see phone numbers and other information and messages. The portable consumer device 500 may further include input elements 32(e) to allow a consumer to input information into the device, a speaker 32(f) to allow the consumer to hear voice communication, music, etc., and a microphone 32(i) to allow the consumer to transmit her voice through the portable consumer device 500. The portable consumer device 500 may also include an antenna 32(a) for wireless data transfer (e.g., data transmission).

Embodiments of the invention have a number of technical advantages. Certain embodiments of the invention can provide alert messages that contain product-specific information, such as pricing or suggestions on related purchases. Conventional transaction systems do not transmit product data during payment processing, and therefore cannot produce such product specific messages. In embodiments of the invention disclosed herein, product identifiers may be transmitted, along with other payment information, during payment processing. In other embodiments of the invention disclosed herein, product identifiers may be analyzed by systems located at or nearby the merchant. Such "edge" systems can complement the payment processing systems, and can allow for the benefits of product specific messaging without changing the underlying transaction processing systems.

Embodiment of the invention can allow consumers to receive messages with specific, targeted information. These messages can contain product specific data, and thus can provide benefits based upon the actual products purchased. For example, embodiments disclosed herein can alert a consumer to the same or similar products as purchased that are sold for lower prices. This can lead to more efficient dissemination of pricing across merchants, which can reduce costs to consumers and enhance transparency of competition. In some implementations, the messages can also alert consumers to merchant information based upon the products purchased, such as the merchant's ability to honor a warranty. Embodiments of the invention are able to provide incentives and suggestions on complementary products, which can increase a merchant's sales.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, an optical medium such as a CD-ROM, or other physical memory devices. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:
1. A method comprising:
receiving, by a server computer, a product identifier in an authorization request message at a server computer for a product after the product has been purchased in a transaction conducted by a user with a first merchant computer of a first merchant, the product having a first merchant price;
accessing, by the server computer, a database including product data associated with the product identifier and a plurality of notification templates;
selecting, by the server computer, the product data associated with the product identifier stored in the database;
selecting, by the server computer, a notification template based on the product data from the plurality of notification templates stored in the database;
formatting, using the server computer, a product alert indicator, by populating the selected notification template with at least a portion of the product data associated with the product identifier, the product data including a second merchant price of the product from a second merchant;
sending, by the server computer, the product alert indicator to a user device operated by the user; and
after sending the product alert indicator, receiving the product identifier in a second authorization request message from a second merchant computer associated with the second merchant, wherein the product identifier is associated with the product in a second transaction conducted with the user with the second merchant computer.
2. The method of claim 1, wherein the second merchant price is lower than the first merchant price.

3. The method of claim 1, wherein the product data further includes an approximate distance from the user device to the second merchant.

4. The method of claim 1, wherein the product data includes a reliability assessment of the first merchant.

5. A method comprising:
receiving, by a server computer, a product identifier in an authorization request message at a server computer for a product after the product has been purchased in a transaction conducted by a user with a first merchant computer, the product having a first merchant price;
accessing, by the server computer, a database including product data associated with the product identifier and a plurality of notification templates,
wherein the product data includes a reliability assessment of a first merchant associated with the first merchant computer and wherein the reliability assessment is based on customer review data or a percentage likelihood that the first merchant will file for bankruptcy;
selecting, by the server computer, the product data associated with the product identifier stored in the database;
selecting, by the server computer, a notification template based on the product data from the plurality of notification templates stored in the database;
formatting, using the server computer, a product alert indicator, by populating the selected notification template with at least a portion of the product data associated with the product identifier, the product data including a second merchant price of the product from a second merchant;
sending, by the server computer, the product alert indicator to a user device operated by the user; and
after sending the product alert indicator, receiving the product identifier in a second authorization request message from a second merchant computer associated with the second merchant, wherein the product identifier is associated with the product in a second transaction conducted with the user with the second merchant computer.

6. The method of claim 1, wherein the database includes a plurality of product identifiers and a plurality of product data, and each product identifier in the plurality of product identifiers is associated with product data from the plurality of product data.

7. The method of claim 1, wherein the database is located on an edge of a payment processing network.

8. The method of claim 1, wherein the user device comprises a wireless phone.

9. The method of claim 1, wherein the authorization request message is sent between the first merchant computer and a payment processing network.

10. The method of claim 1 further comprising:
sending the product alert indicator to the user device prior to the user leaving premises associated with the first merchant computer.

11. The method of claim 1, wherein the product alert indicator is generated when the first merchant price is greater than the second merchant price.

12. The method of claim 1, wherein the product alert indicator is sent to the user device after an authorization response message related to the product identifier is received from an issuer at the server computer.

13. The method of claim 1, wherein the product identifier is a SKU or UPC number.

14. The method of claim 1 wherein the authorization request message comprises a purchase amount for the transaction and a merchant category code, and wherein the authorization request message is received from the first merchant selling the product via an acquirer, and wherein the method further comprises:
sending the authorization request message to an issuer of an account associated with a portable consumer device that is used to conduct the transaction.

15. The method of claim 1, wherein the database comprises merchant data in addition to the product data, the product identifier, and the plurality of notification templates.

16. A method comprising:
conducting a transaction by a user with a first merchant computer for a product having a first merchant price, the product associated with a product identifier,
wherein the product identifier is transmitted in an authorization request message to a server computer;
receiving a product alert indicator at a user device after the product has been purchased,
wherein the product alert indicator is generated from a database including product data and a plurality of notification templates,
wherein the product alert indicator including product data associated with the product identifier that was formatted by the server computer using a selected notification template based on the product data from the plurality of notification templates stored in the database, the product data including a second merchant price of the product from a second merchant;
conducting a second transaction by the user with a second merchant computer for the product having the second merchant price,
wherein the product identifier is transmitted in a second authorization request message to the server computer; and
receiving a second product alert indicator at the user device,
wherein the second product alert indicator is associated with the second merchant, wherein the product identifier is associated with the product in the second transaction conducted with the user with the second merchant computer.

17. The method of claim 16, wherein the second merchant price is lower than the first merchant price.

18. The method of claim 16, wherein the user device comprises a wireless phone.

19. The method of claim 16, wherein the product alert indicator includes product data on one or more related products.

20. The method of claim 16 wherein the authorization request message comprises a purchase amount for the transaction and a merchant category code, and wherein the authorization request message is received from a first merchant selling the product via an acquirer, and wherein the method further comprises:
sending the authorization request message to an issuer of an account associated with a portable consumer device that is used to conduct the transaction.

21. A system comprising:
a database comprising product data associated with product identifiers for products and a plurality of notification templates; and
a server computer coupled to the database, wherein the server computer comprises a processor and a computer-readable medium coupled to the processor, the computer-readable medium comprising code executable by the processor for implementing a method comprising:

receiving a product identifier in an authorization request message at the server computer for a product after the product has been purchased in a transaction conducted by a user with a first merchant computer, the product having a first merchant price;

selecting the product data associated with the product identifier stored in the database;

selecting a notification template based on the product data from the plurality of notification templates stored in the database;

formatting a product alert indicator using the product identifier by populating the selected notification template with at least a portion of the product data associated with the product identifier, the product data including a second merchant price of the product from a second merchant;

sending the product alert indicator to a user device operated by the user; and after sending the product alert indicator, receiving the product identifier in a second authorization request message from a second merchant computer associated with the second merchant, wherein the product identifier is associated with the product in a second transaction conducted with the user with the second merchant computer.

22. The system of claim 21, wherein the system is coupled to a payment processing network configured to process the transaction.

23. The system of claim 22, wherein the system is located on the edge of the payment processing network.

24. The system of claim 21 wherein the authorization request message comprises a purchase amount for the transaction and a merchant category code, and wherein the authorization request message is received from a first merchant selling the product via an acquirer, and wherein the method further comprises:

sending the authorization request message to an issuer of an account associated with a portable consumer device that is used to conduct the transaction.

* * * * *